(12) United States Patent
Anderson

(10) Patent No.: US 6,370,523 B1
(45) Date of Patent: Apr. 9, 2002

(54) SYSTEM AND METHODS FOR DETERMINING A DESIRED LISTING USING AN INTERSECTION OF COVERAGE AREAS AND A SEARCH REGION

(75) Inventor: Charles Dewey Anderson, Roswell, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/049,632

(22) Filed: Mar. 27, 1998

(51) Int. Cl.$^7$ .............................................. G06F 17/30
(52) U.S. Cl. ..................... 707/3; 707/5; 707/7; 707/10; 701/202; 701/206; 709/201; 709/219; 379/88.2; 379/127; 379/133
(58) Field of Search .............................. 707/3, 5, 7, 10; 701/202, 206; 709/201, 219; 379/127, 133, 88.2

(56) References Cited

U.S. PATENT DOCUMENTS

| | | | |
|---|---|---|---|
| 4,827,500 A | | 5/1989 | Binkerd et al. ................ 379/88 |
| 4,954,958 A | * | 9/1990 | Savage et al. ............... 701/202 |
| 5,191,532 A | * | 3/1993 | Moroto et al. ............... 701/201 |
| 5,231,584 A | * | 7/1993 | Nimura et al. ............... 701/202 |
| 5,506,897 A | | 4/1996 | Moore et al. ................ 379/220 |
| 5,588,048 A | | 12/1996 | Neville ......................... 379/127 |
| 5,848,131 A | | 12/1998 | Shaffer et al. ................. 379/88 |
| 5,966,126 A | * | 10/1999 | Szabo ......................... 345/348 |
| 5,968,109 A | * | 10/1999 | Israni et al. ................. 701/208 |

* cited by examiner

Primary Examiner—Jean R. Homere
(74) Attorney, Agent, or Firm—Kilpatrick Stockton

(57) ABSTRACT

A system and method for determining a desired listing by ranking coverage areas based on the intersection of a search region and one or more coverage areas. The desired listing is created by determining the location of a reference point and defining the search region in respect to the reference point. The search region is compared against the coverage areas of the listings. The coverage area of each listing may be defined by default based upon a categorization of the listing or upon selection criteria, such as payment of a fee. The coverage areas that intersect with the search region are typically ranked in descending order based upon the area of the intersection region, which is the area including both the coverage area and the search region. Alternatively, if no intersecting regions exist, the coverage areas may be ranked in descending order based on the proximity of the perimeter of the coverage areas to the reference point. The ranked coverage areas are produced as the desired listing and may be distributed.

20 Claims, 5 Drawing Sheets

SYSTEM AND METHODS FOR DETERMINING A DESIRED LISTING USING AN INTERSECTION OF COVERAGE AREAS AND A SEARCH REGION

TECHNICAL FIELD

This invention generally relates to information retrieval and, more particularly described, relates to determining a desired listing, such as for a business, from a search using an intersection of coverage areas and a search region.

BACKGROUND OF THE INVENTION

The telephone rings and an employee answers the phone, "Hello, Acme Pizza Delivery. How may I help you?" The caller responds, "Yeah, I am starving. I am really craving a loaded pizza with the works. You know, pepperoni, sausage, mushrooms, peppers, extra cheese, onions, olives, and anchovies . . . and don't forget ham and extra garlic." The caller proceeds to order several more pizzas, a full complement of drinks, and six orders of breadsticks. The employee finishes taking the order as the caller asks, "Can you deliver this stuff to my house?" The employee responds, "Sure we can deliver. What's your address?" The hungry caller says, "1234 East Broad Street." "Oh. 1234 East Broad Street, huh? I'm sorry sir, we don't deliver in that area." The silence is deafening. The caller cannot believe what he is hearing. "You will have to call one of our other stores that serves your location." The caller, now frustrated at the prospect of giving the order again and still hungry, hangs up the telephone and tries to find the appropriate store that serves his location.

The caller in the above example may have avoided his frustration and quickly eased his hunger pains if he had used some type of information retrieval system to determine the closest business entity, such as a pizza delivery business, to serve his address. Using such a system, the caller may call a single number and, depending on the location associated with the caller's telephone number, the caller is connected with the closest business entity to serve the caller's location. Some businesses offering delivery services, such as pizza delivery businesses, employ such systems to avoid the exact customer dissatisfaction issues raised in the above example.

In more detail, when using the information retrieval system, the caller typically searches for information about the closest entity to serve the given location. The caller may be searching for information about the closest business, the closest governmental entity (such as a police station or fire station), or even the closest hospital. However, the usefulness of any such information retrieval system is dependent upon the accuracy of making the determination of the closest entity to serve the given location.

In one attempt to provide such an accurate determination, the determination of the closest business entity to serve a given location uses a pure distance calculation from the given location to the business entity. The pure distance is a point-to-point distance between coordinates of the given location and the coordinates of the business entity. However, using a pure distance from the given location to the business entity does not reflect the business' draw area for customers. A draw area (also called a coverage area) for a business is essentially the area in which the business can provide its goods or services to potential customers. For example, a business two miles away that only serves customers in a certain zip code area (not including the given separate location) may not be the closest business entity to serve the given location when a second business three miles away serves several counties, including the given location. Thus, using a pure distance to the given location may not always provide the most accurate determination of the closest business entity to serve a given location.

In another attempt to provide such an accurate determination, the closest business entity to serve a given location is determined by a search using predefined boundaries. Typically, such a system allows a caller (also more generally called a user) to search by predefined boundary (such as county, city, neighborhood, zip code, or other politically defined boundary) for the closest business entity serving the given location. Unfortunately, searching by predefined boundary can be inaccurate and problematic as well. For example, a close business serving the given location may be just outside the searched region (e.g., the searched county, city, neighborhood, or zip code) while being only a very short distance from the given location. The search simply misses the business due to the use of predefined boundaries. Thus, using predefined boundaries during a search for the closest business entity serving a given location may also lead to an inaccurate determination of the closest business entity serving the given location.

A system available from Southwestern Bell of San Antonio, Texas called the "Intellinumber" system allows a business to select a trade area or coverage area associated with a business. However, in the "Intellinumber" system, the trade area of the business is defined by standard ZIP+4 codes. The business is able to select a trade area that is then translated into a region defined by the standard ZIP+4 codes. When a caller uses the business' central number, the "Intellinumber" system matches the call with the appropriately defined trade area for the business. In this manner, the trade area of the business is simply a territory defined by predefined boundaries. This may become frustrating when a business' trade area is not accurately represented with predefined boundaries. As a result of the inaccurate representation, dependence upon predefined boundaries when defining a trade area of a business can also lead to an inaccurate determination of the closest entity to serve a given location.

In summary, there is a need for determining a closest business entity to serve a given location that (1) more accurately determines the closest entity, (2) does not depend upon predefined or, more particularly, politically established boundaries, (3) allows for arbitrary and customized definitions of coverage areas, and (4) allows for default definitions of coverage areas depending upon a categorization of the entity.

SUMMARY OF THE PRESENT INVENTION

The present invention is directed to a system and methods for determining a desired listing using an intersection of a search region and one or more coverage areas. In general, a desired listing is another term for a representation of the closest entity serving a given location or reference point. A coverage area is defined for each listing representing an entity, such as a business, a governmental unit (e.g., a police station, a library, a school, or a fire station), or a hospital. The listings and their associated coverage areas are maintained within an index to a database. The index is essentially a guide used to find data from within the database because each listing in the index is related to a specific record of data within the database. The listings are categorized within the index to make it easier to search for data related to the listings using the index.

The coverage area may be defined without regard to predefined boundaries and may be any arbitrary polygon shape. While a coverage area may be conveniently discussed in terms of a business' coverage area for listings associated with a particular type of business entity, those skilled in the art will quickly realize the applicability of the concepts of the present invention to other types of entities, such as defining a service coverage area for a hospital or a draw area for a school. Another example may be the service coverage area defined for a fire department. Thus, it is important to realize that the principles of the present invention are applicable when attempting to determine a desired one of several entities that provide goods or services to customers, users, or consumers.

Stated generally, the present invention provides a method for determining a desired listing from a group of listings using an intersection of a search region and coverage areas associated respectively with each of the listings. The general method begins by creating a definition with respect to each of the coverage areas. The definition is created without regard to a predefined boundary, such as a zip code, city, county, or other politically defined boundary.

The definition may be created as a predetermined area based upon a categorization of each of the listings. As mentioned above, the listings are categorized within the index. Typically, the definition with respect to a coverage area is defined in default to be the predetermined area depending on the listing's category. For example, one category of restaurants may have a one mile radius coverage area while another category of restaurants may only have a 0.2 mile radius coverage area.

Additionally, the coverage area definition may be created as a selectable area for each of the listings based upon selection criteria for the selectable area. For example, the selection criteria may be whether a fee has been paid to define the selectable area. If so, the selectable area may be a customized size and shape to better suit the entity paying the fee (selecting the area).

In one aspect of the present invention, a reference point may be determined within the search region. Typically, the reference point may be determined based upon provided information about the reference point. The provided information may include a telephone number of a telecommunications device. The provided information may also be received over a first telecommunications device as the telephone number of a second telecommunications device.

Furthermore, a location of the reference point may be determined based upon the provided information. The location may be determined based upon the provided information being location data. The location data, such as conventional longitude and latitude coordinates, provides the location of the reference point. Typically, the location data is associated with a telephone number within a lookup table. However, the location data may also include data, such as global positioning system (GPS) location data, embedded within a signal generated by a telecommunications device. The location data may be interpreted to determine the reference point's location.

Next, the coverage areas intersecting the search region are found within the search region. These coverage areas are typically referred to as intersecting coverage areas. Additionally, these intersecting coverage areas may be ranked into a ranked order. In one aspect of the present invention, this step of ranking is based upon the amount of area intersecting the search region with respect to each of the intersecting coverage areas. Normally, the highest in the ranked order represents the intersecting coverage area having the greatest amount of area intersecting the coverage area. However, in another aspect of the present invention, the step of ranking is based upon the proximity of each of the intersecting coverage areas to the reference point.

Finally, one of the listings is identified as the desired listing based upon its association with a predetermined one of the intersecting coverage areas. Usually, the identification of the desired listing is based upon the fact that the desired listing is associated with a predetermined one of the intersecting coverage areas in the ranked order, such as the highest ranked intersecting coverage area.

More particularly described, the present invention provides a more detailed method for determining a desired listing from a group of listings using an intersection of a search region and coverage areas associated respectively with each of the listings. The more detailed method begins by creating a definition with respect to each of the coverage areas. The definition is created without regard to a predefined boundary, such as a politically defined boundary. Each of the coverage areas are normally defined as a predetermined area based upon a categorization of each of the listings. However, the coverage areas may be defined as a selectable area based upon selection criteria, such as whether or not a fee has been paid.

A reference point is determined based upon provided information about the reference point. The provided information may be a telephone number of a telecommunications device. The provided information may also be received over a first telecommunications device as the telephone number of a second telecommunications device.

A location of the reference point is also determined based upon the provided information. The provided information may include location data maintained within a lookup table and referenced to the telephone number. This location data provides the location of the reference point. Additionally, the location data may be within a signal generated by the telecommunications device. The search region is then selected based upon a proximity of the search region to the reference point.

Once the coverage areas are defined, the reference point determined and the search region selected, each of the coverage areas intersecting the search region are found. These coverage areas are referred to as the intersecting coverage areas and are ranked into a ranked order. The intersecting coverage areas are typically ranked based upon an amount of area intersecting the search region with respect to each of the intersecting coverage areas. By ranking based on the amount of intersecting area, the highest in the ranked order may correspond to the intersecting coverage area having the greatest of the amount of area intersecting the search region. The intersecting coverage areas may also be ranked into the ranked order based upon a proximity of each of the intersecting coverage areas to the reference point.

Finally, one of the listings is identified as the desired listing based upon the listing's association with a highest of the intersecting coverage areas in the ranked order.

In yet another aspect of the present invention, the present invention is a system for determining a desired listing from a group of listings using an intersection of a search region and coverage areas associated respectively with each of the listings. The system includes a processor, a memory storage device coupled to the processor, and a communications interface also coupled to the processor. The memory storage device maintains an index of the listings. Each of listings within the index is categorized based on an association of each listing with at least one index category. The memory storage device also maintains a lookup table. The communications interface is used to communicate to a remote device, such as a telecommunications device or remote computer.

In this configuration, the processor can create a definition within the index with respect to each of the coverage areas. The definition is created without regards to a predefined boundary, such as a politically defined boundary, and is normally based upon the index category of the listing associated with the coverage area. Additionally, the processor may create the coverage area definition to be a selectable area for each of the listings based upon selection criteria, such as whether a fee has been paid to define custom parameters of the selectable area.

The processor can also receive provided information about a reference point from the remote device over the communications interface. The provided information may be a telephone number of the remote device. The processor can also determine a location of the reference point by using the provided information to find location data associated with the reference point. The location data is maintained within the lookup table on the memory storage device. However, the provided information may also be location data within a signal generated by the remote device. In this situation, the location data may be interpreted by the processor to determine the location of the reference point.

The processor is further operative to search and find the coverage areas intersecting the search region. These coverage areas are referred to as the intersecting coverage areas. The processor is capable of ranking the intersecting coverage areas into a ranked order. Typically, a highest in the ranked order corresponds to the intersecting coverage area having the greatest of the amount of area intersecting the search region. Alternatively, the processor can rank the intersecting coverage areas based upon a proximity of each of the intersecting coverage areas to the reference point.

The processor can then identify one of the listings maintained within the memory storage device as the desired listing. Such an identification of the desired listing can be performed by the processor based upon the listing associated with a predetermined one of the intersecting coverage areas in the ranked order. Typically, this would be the highest ranked intersecting coverage area in the ranked order. Finally, the processor can distribute the identification of the desired listing over the communications interface to the remote device.

Although the exemplary embodiments of the present invention are directed towards systems and methods for determining a desired listing using an intersection of a search region and coverage areas, it should be understood that the present invention may be applied to a broad variety of other information retrieval systems.

In summary, it is an object of the present invention to provide a system and method for determining a listing using an intersection of a search region and coverage areas.

It is a further object of the present invention to provide a system and method that more accurately determines a desired listing representing a closest entity capable of serving a reference point.

It is still a further object of the present invention to determine a desired listing without regard to predefined boundaries, such as politically defined boundaries.

It is still a further object of the present invention to allow for arbitrary definitions of coverage areas.

It is still a further object of the present invention to allow for default definitions of coverage areas depending upon a categorization of the entity represented within an index as a listing.

The present invention and its object and advantages, those described above and otherwise, will be appreciated from studying the following detailed description, drawings, and the appended claims.

DETAILED DESCRIPTION OF THE EXEMPLARY EMBODIMENT

Definitions

Figure 1:
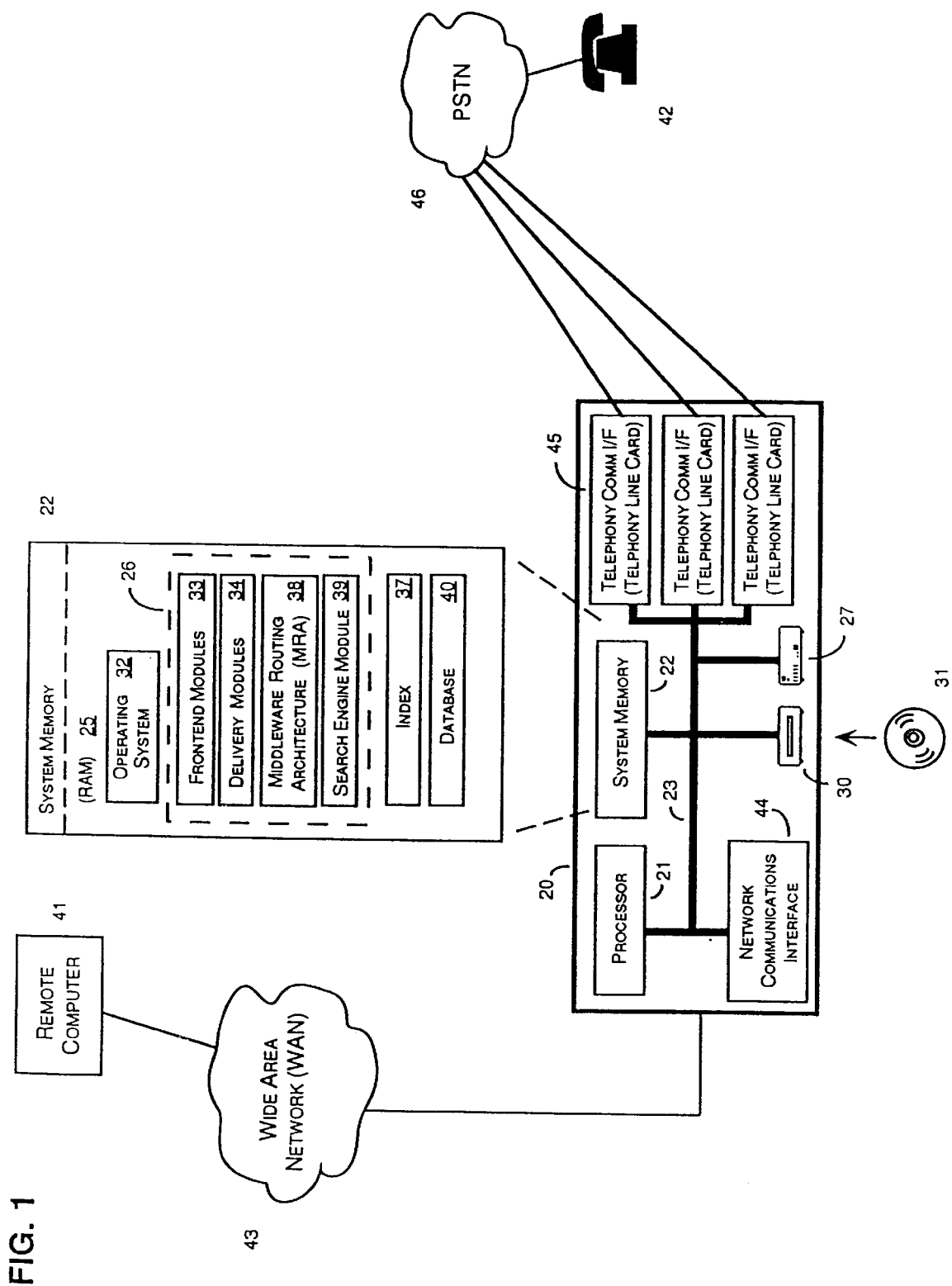
FIG. 1 is a block diagram of a computer system that provides an exemplary operating environment for an embodiment of the present invention.

Throughout the detailed description of embodiments of the present invention, terms familiar to one skilled in the art will be used. Additionally, the following definitions should be used in reference to embodiments of the present invention described herein:

"COVERAGE AREA"—a geographic area defined without regard to predefined boundaries in which an entity provides its goods or services to users or consumers.

"CATEGORY"—a type of a listing in an index.

"DESIRED LISTING"—a representation of the closest entity serving a reference point.

"ENTITY"—an organization that provides goods or services.

"INDEX"—a structured guide or tool, associated with a database, used to find information within the database.

"LISTING"—a representation of an entity.

"LOCATION DATA"—coordinates or information regarding the location of a reference point.

"LOOKUP TABLE"—a reference used to cross reference location data with information about a reference point.

"POLITICAL BOUNDARY"—a standardized or governmental border of a region, such as a city, county, neighborhood, community, or zip code.

"RANKED ORDER"—an order or sequence of coverage areas found within a search region.

"REFERENCE POINT"—a point from which to define a search region.

"REMOTE DEVICE"—a device used to communicate a user's selections.

"SEARCH REGION"—an area, defined in relation to a reference point, in which to search for coverage areas.

"SELECTION"—information associated with a reference point.

Introduction

The present invention is directed to a system and methods for determining a desired listing using an intersection of a search region and one or more coverage areas. In general, a desired listing is another term for a representation of the closest entity serving a given location or reference point.

A coverage area is defined for each listing representing an entity, such as a business, a governmental unit (such as a police station, a library, a school, or a fire station), or a hospital. The coverage area is defined without regard to predefined boundaries and may be any arbitrary polygon shape. In the following description of embodiments of the present invention, a coverage area is typically discussed in terms of a business' coverage area for listings associated with a particular type of business entity. However, those skilled in the art will quickly realize the applicability of the principles of the present invention to other types of entities capable of providing goods or services to users, customers, or consumers.

The listings and their associated coverage areas are maintained within an index to a database. The index is essentially a guide used to find data from within the database because each listing in the index is related to a specific record of data within the database. The listings are categorized within the index to make it easier to search for data related to the listings using the index.

An exemplary embodiment of the present invention is represented by a group of software modules operating as an interactive information retrieval system (hereinafter the IR system) that uses or processes the index. Briefly described, the IR system creates a definition for coverage areas for each listing without regard to predefined boundaries. For example, a business may be represented by a listing having a defined coverage area corresponding to the business' typical service or draw area. A police station may be represented by a listing having a defined coverage area corresponding to that particular police station's responsible territory.

A reference point, also called an origin, is generally determined within a search region. The search region is typically radially searched outward from the reference point to find which of the coverage areas overlap or intersect the search area. The coverage areas intersecting the search area (typically referred to as intersecting coverage areas) may be ranked into a ranked order depending on either (1) the amount of intersecting area for each intersecting coverage area or (2) the proximity of the reference point to the edge of each intersecting coverage area. The listing associated with the coverage area ranked highest in the ranked order is identified as the desired listing, i.e., the listing more accurately representing the closest entity serving the reference point. In summary, the general focus of the present invention is the intersection of the coverage areas and the search region providing the basis for an accurate determination of the desired listing.

Although the preferred embodiment is generally described in the context of the software modules in the IR system used with a computer system, those skilled in the art will recognize that the present invention also can be implemented in conjunction with objects and other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet. Other methods and system implementations will occur to those skilled in the art.

The detailed description which follows is represented largely in terms of processes and symbolic representations of operations by conventional computer components, including a processor, memory storage devices, data communication networks, and communications interfaces such as telephony line cards or network interface cards. Furthermore, these processes and operations may utilize conventional computer components in a heterogeneous distributed computing environment, including remote file servers, compute servers, and remote memory storage devices.

The processes and operations performed by the computer, in both a stand-alone environment and a distributed computing environment, include the manipulation of signals by a processor and the maintenance of these signals within data sets, such as the database, and data structures, such as the index. Basically, a data set is a collection of related information in separate elements that are manipulated as a unit. A data structure is a structured organizational scheme that encapsulates data in order to support data interpretation and data operations. The data structure imposes a physical organization upon the collection of data stored within a memory storage device and represents specific electrical or magnetic elements. Each of these data sets and data structures are resident in one or more memory storage devices. In the context of the present invention, a data structure can be created from the separate elements or objects of a data set or another data structure. An index is an example of such a data structure. In the context of the present invention, a database can be a data set or a data structure depending on the particular implementation. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, data, listings, data, objects, tables, files or the like. It should be kept in mind, however, that these and similar terms are associated with desired physical quantities for computer operations, and that these terms are merely conventional labels applied to physical quantities that exist within and during operation of the computer.

It should also be understood that manipulations within the computer are often referred to in terms, such as providing, defining, searching, selecting, ranking, determining, identifying, storing, distributing, etc., which are often associated with manual operations performed by a human operator. The operations described herein are machine operations performed in conjunction with various input provided by a human operator or user that interacts with the computer or a device connected to the computer.

In addition, it should be understood that the programs, processes, methods, etc. described herein are not related or limited to any particular computer (standalone or distributed) or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment are described.

The Operating Environment for Embodiments of the Invention

FIG. 1 and the following discussion are intended to provide a brief, general description of an exemplary computing environment in which the present invention may be implemented and operated. Embodiments of the invention are described in the general context of software program modules that run on an operating system in conjunction with a computer. Generally, program modules include routines, programs, components, data structures, etc., that perform particular tasks or implement particular abstract data types. Moreover, those skilled in the art will appreciate that the invention may be practiced with other computer system configurations, including multiprocessor systems, other microprocessor-based or programmable electronic devices, minicomputers, mainframe computers, and the like. Those skilled in the art will appreciate that FIG. 1 and the associated discussion are intended to provide a brief, general description of exemplary computer hardware and program modules, and that additional information is readily available in the desired programming manuals, users guides, and similar publications.

Referring now to FIG. 1, an exemplary computer system for implementing the present invention includes a conventional computer 20, including a processor 21, a system memory 22, and a system bus 23 that couples the system memory 22 to the processor 21. Although not shown in FIG. 1, the exemplary computer system for implementing the present invention may include additional processors, each of which are coupled to the system memory 22. In this alternative configuration, the additional processors are deemed to be adjunct processors capable of being dedicated to particular software processes concurrently executing within the computer 20.

The system memory 22 includes quickly-accessible random access memory (RAM) 25. The computer 20 further includes a hard disk drive 27 and an optical disk drive 30 (e.g., a disk drive that reads from a CD-ROM disk 31 or reads from or writes to other optical media). The hard disk drive 27 and the optical disk drive 30 are connected to the system bus 23. The drives and their associated computer-readable media provide non-volatile storage for the computer 20. Although the description of computer-readable media above includes the hard disk drive 27 and the optical disk 31, such as a CD, it should be appreciated by those skilled in the art that other types of media, which are readable by a computer, and computer system architectures may also be used in each of the exemplary operating environments described with regard to FIG. 1.

A number of program modules may be stored in the drives 27, 30 and RAM 25, including an operating system 32 and a variety of other software program modules. In an embodiment of the present invention, an example of such software modules is a group of software modules collectively referred to as interactive information retrieval system modules 26 (IR system modules). The IR system modules 26 preferably include the following software modules:

one or more front end modules 33,
one or more delivery modules 34,
a middleware layer of software 38 for routing information and requests between others of the IR system modules 26, and
a search engine module 39 (which interacts with a database 40 and an index 37, both of which may be stored on the hard disk drive 27 or on the optical disk 31 in the optical disk drive 30).

When any of the IR system modules 26 are used, the processor 21 may only bring a portion of the module into memory at a time due to the size of the module. For example, the operating system 32 and the database 40 are shown as residing within RAM 25. However, in the exemplary embodiment, only a portion of these software modules may be maintained within RAM 25 due to their prohibitive size. The software modules comprising the IR system modules 26 are discussed in greater detail below with regard to FIG. 2.

The operating system 32 provides the basic interface between the computer's hardware and software resources, the user, and the IR system modules 26. In the exemplary operating environments described with regard to FIG. 1, the operating system 32 is preferably a real-time operating system, such as the SOLARIS operating system, produced by SunSoft, a division of Sun Microsystems, Inc. A real-time operating system is desired in order to provide adequate response when searching and interacting with multiple users or callers. The SOLARIS operating system has a multithreaded, real-time UNIX kernel capable of supporting symmetric multiprocessing. Those skilled in the art will appreciate the need for real-time, multithreaded performance in information retrieval applications in order to support an adequate level of transactional performance. Furthermore, those skilled in the art will be familiar with multiprocessing operating systems. Additional information regarding the SOLARIS operating system is available by reference to system manuals published by Sun Microsystems and other widely available literature on UNIX operating systems.

As with most conventional computer systems, a user may enter commands and provide information into the computer 20 through a keyboard (not shown) and an input or pointing device, such as a mouse (not shown). These and other input devices are often connected to the processor 21 through a serial port interface (not shown) connected to the system bus 23. A monitor (not shown) or other type of display device can also be connected to the system bus 23. In addition to the monitor, computers such as the computer 20 typically include other peripheral output devices (not shown), such as printers and backup devices.

In the exemplary embodiment, a user typically interacts with the computer 20 when the computer 20 functions in a server capacity. In this capacity, the computer 20 can service a remote programmable device such as a remote computer 41, or a telecommunications device such as a conventional telephone 42, both of which are more generally and collectively referred to as remote devices. Each of the remote devices (the remote computer 41 and the conventional telephone 42) are logically connected to the computer 20.

The remote computer 41 may be a server, a router, a peer device, or other common network node. Typically, the remote computer 41 includes many or all of the elements described relative to the standalone computer 20. The logical connection between the remote computer 41 and the computer 20 depicted in FIG. 1 is a data communications network, such as a wide area network (WAN) 43. Other examples of data communications networks include enterprise-wide computer networks, intranets, or the global Internet. A communications interface, such as a network communications interface 44 in the computer 20, links the WAN 43 and the computer 20. However, the logical connections to the computer 20 may also be a local area network (LAN) (not shown) that is commonplace in offices. Typically, a user of the remote computer 41 interacts with the computer 20 via such logical connections in order to search the database 40 for information.

A telephony communication interface 45 (also known as a telephony line card) connected to a conventional public switched telephone network 46 (PSTN) provides the logical connection between the computer 20 and the conventional telephone 42. In this manner, the user can interact with the computer 20 with voice responses via a conventional telephone 42 or other telephonic device. In the preferred embodiment, the telephony communication interface 45 is a Model D/160SC-LS telephone line interface card having an Antares 2000 digital signal processing (DSP) card, both of which are manufactured by Dialogic Corporation of Parsippany, N.J. Both the network communications interface 44 and the telephony communication interface 45 are generally referred to as "communication interfaces" because the computer 20 provides the service of processing data inquiries and distributing the identification of desired listings in response to the data inquiries through both of these interfaces. It will be appreciated that the network and telephone connections shown are exemplary and other means of establishing a communications link between the computer 20 and the remote computer 41 or conventional telephone 42 may be used.

As discussed earlier, the preferred embodiment of the present invention is embodied in the IR system modules 26 which are designed to operate in conjunction with SunSoft's SOLARIS operating system in a single processor computer system 20. However, one skilled in the art will quickly recognize that the invention may be implemented for use with other computer architectures, such as multiprocessor systems where threads are dedicated to distinct processors.

From this brief description, it should be appreciated that operating systems, such as the "SOLARIS" operating system, and networking architectures are quite complex and provide a wide variety of services that allow users and programs to utilize the resources available in the computer or in other computers in a distributed computing environment. Those skilled in the art will be familiar with operating systems, networking architectures and their various features. Likewise, those skilled in the art will appreciate that the IR system modules 26 provide a wide variety of features and functions in addition to those included in the brief description presented above.

Figure 2:
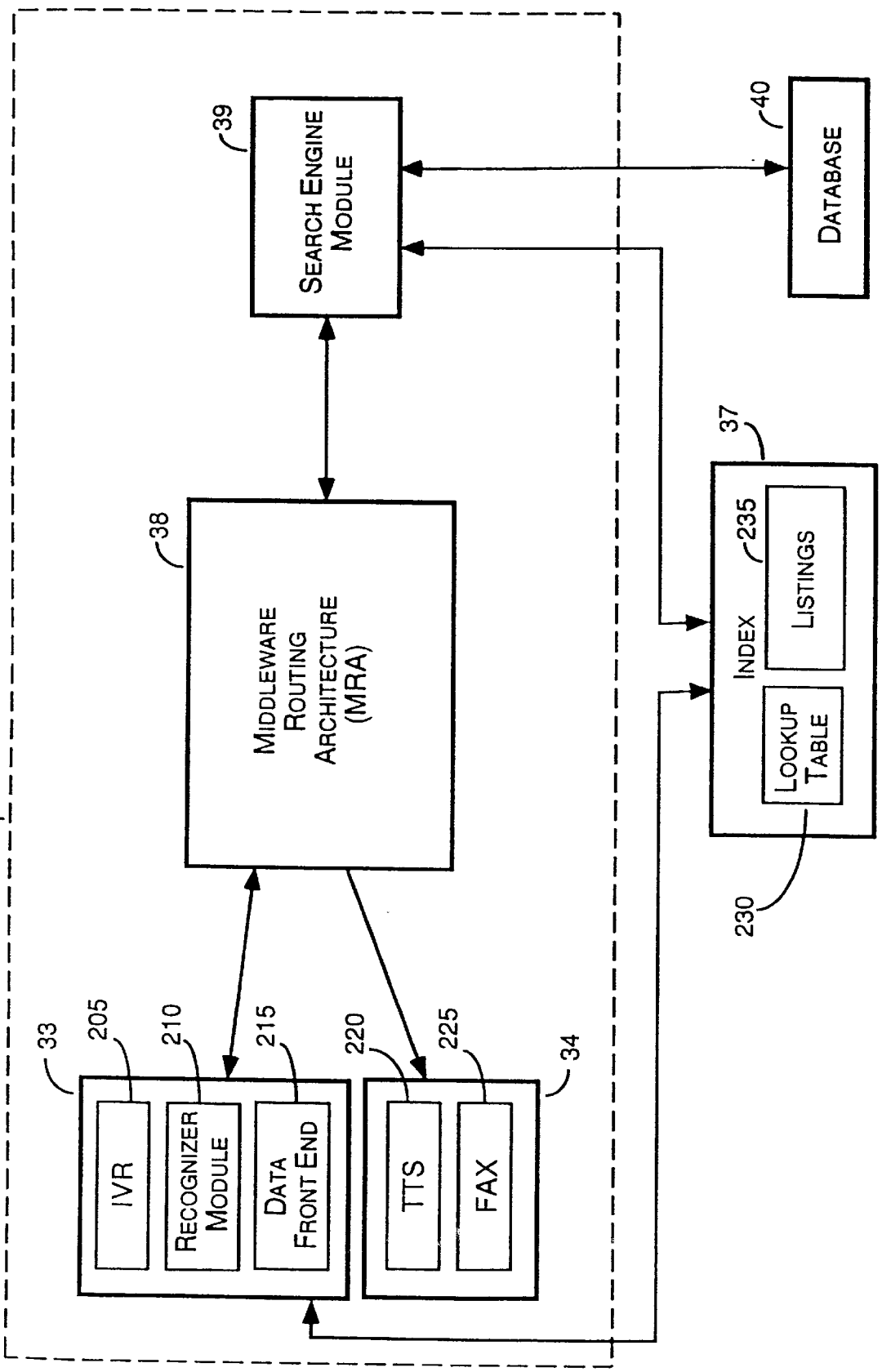
FIG. 2 is a diagram illustrating an index and other software components and their operative interrelationships in the exemplary embodiment of the present invention.
Figure 3:
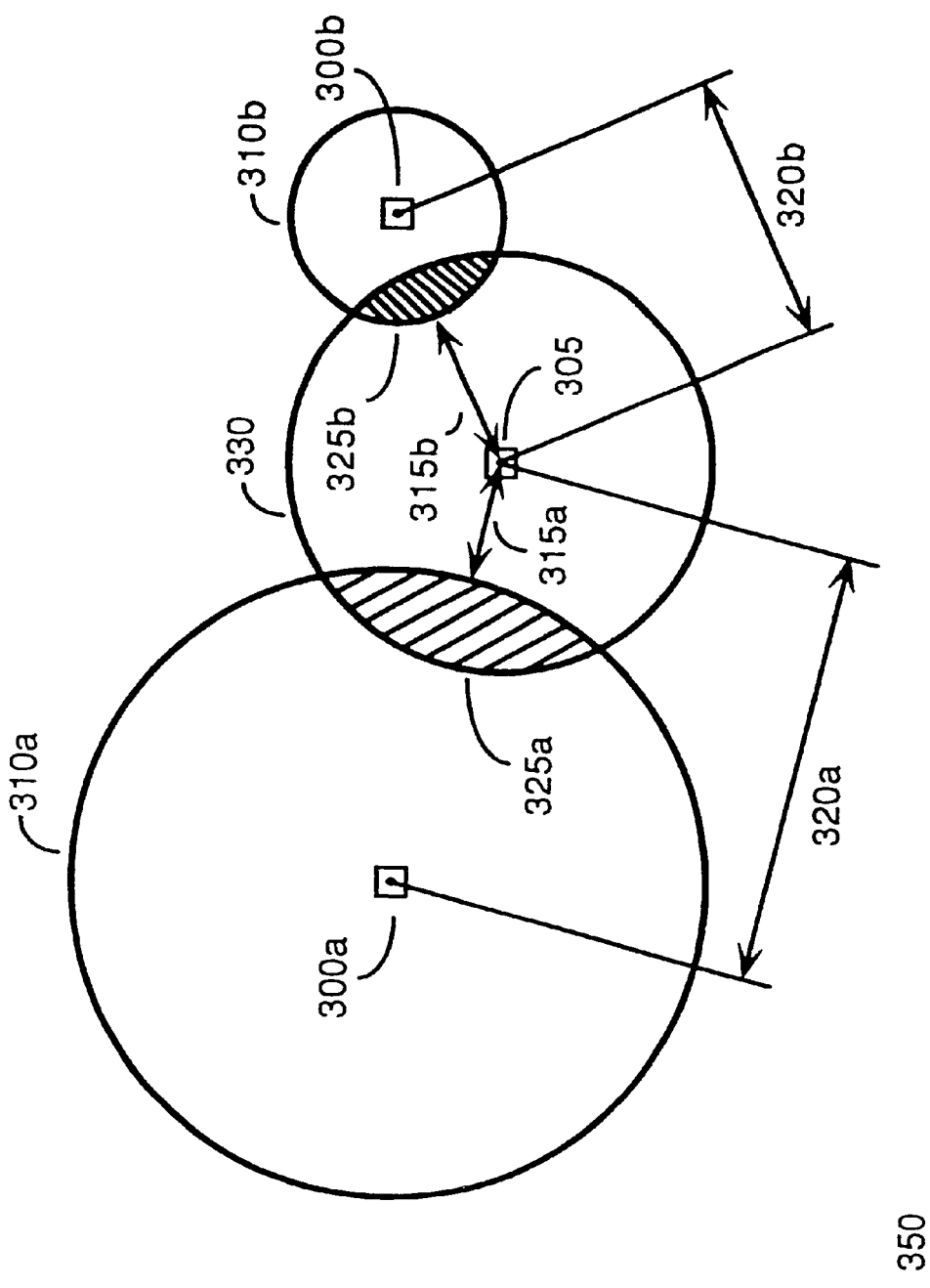
FIG. 3 is a diagram illustrating an intersection of two coverage areas for two entities and a search region defined about a reference point in accordance with an embodiment of the present invention.
Figure 4:
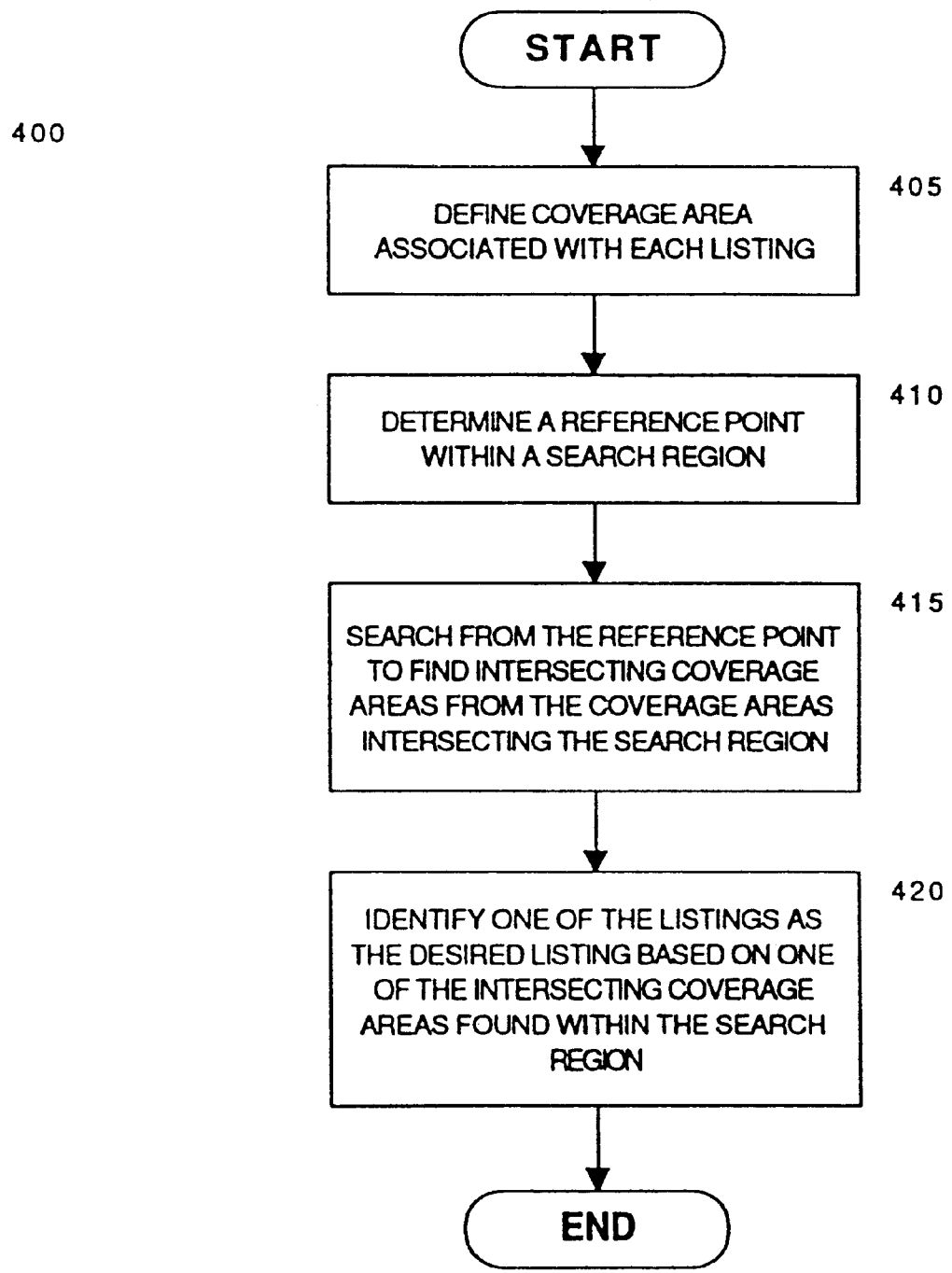
FIG. 4 is a flow diagram illustrating steps of an exemplary method for determining a desired listing using an intersection of a search region and coverage areas for listings.
Figure 5:
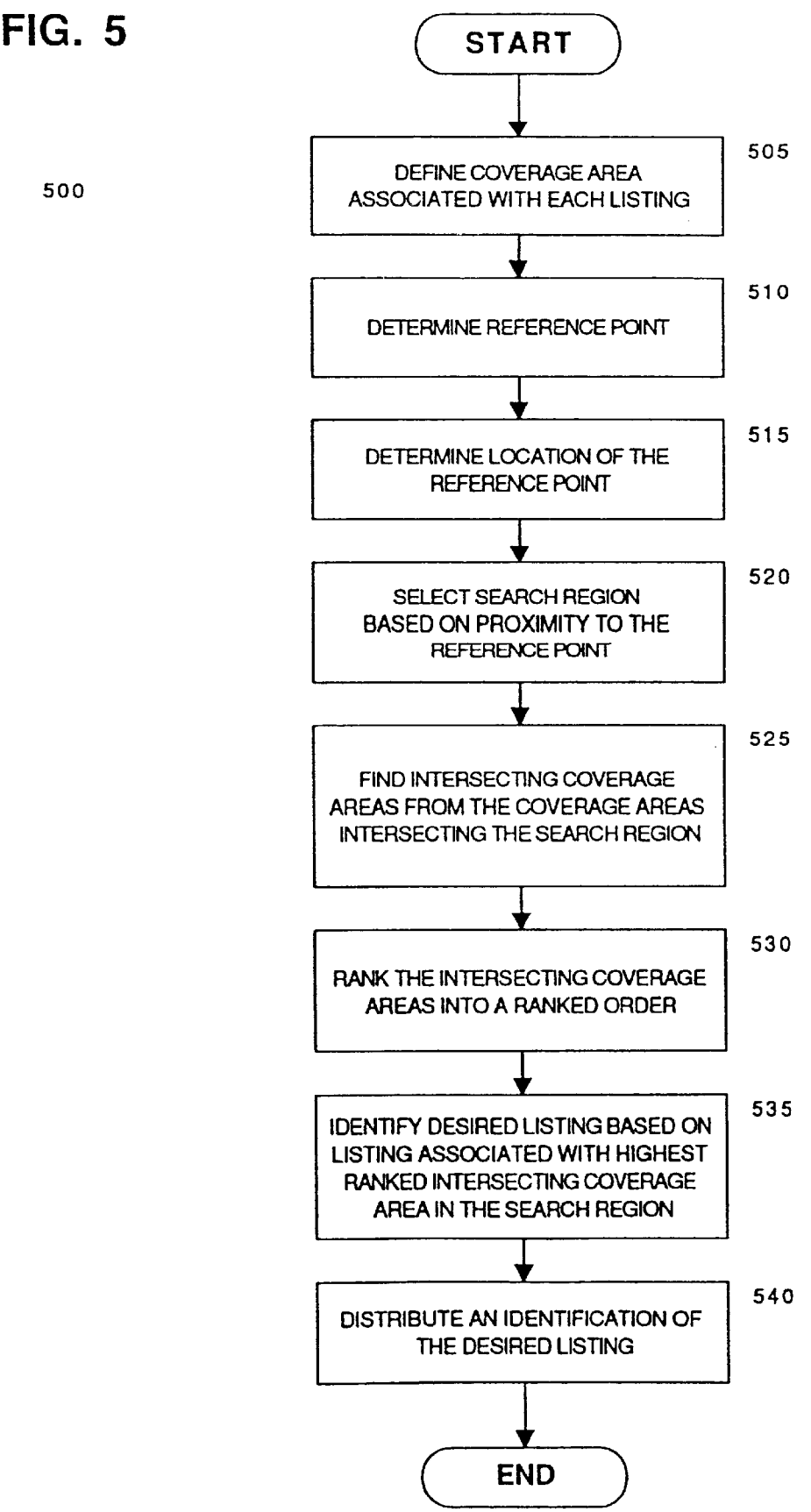
FIG. 5 is a detailed flow diagram illustrating steps of an exemplary method for determining a desired listing using an intersection of a search region and coverage areas for listings.

Turning now to the remaining figures, an exemplary embodiment of the present invention is described. FIG. 2 is a diagram illustrating the index and its interrelationships with other software components in the exemplary embodiment of the present invention. FIG. 3 is a diagram illustrating an exemplary intersection of two coverage areas and a search region defined about a reference point. FIGS. 4 and 5 are flow diagrams illustrating exemplary steps for determining a desired listing using an intersection of a search region and coverage areas for listings.

The Software Modules of the IR System Modules

Referring now to FIG. 2, the software modules of the IR system modules 26 are responsible for searching and processing the index 37 in response to data inquiries to provide the desired listing (representing the closest business entity serving a reference point) to a user. The index 37 contains listings 235, each of which has a defined coverage area. Essentially, a listing 235 represents an entity, such as a business, and is preferably implemented as a categorized element within the index 37 having information about the entity represented by the listing. This information typically includes the defined coverage area. While the principles of the present invention are described in an embodiment where the entity is a business and the coverage area is the business' draw or service area for customers, the principles of the present invention are equally applicable to other entities that provide some kind of goods or services to users or consumers, such as hospitals, police stations, fire stations, or schools.

The coverage area for a particular listing may be a default setting depending upon how the listing is categorized within the index 37. For example, the index 37 may have a "Restaurants—Delivery—Pizza" category and a "Restaurants—Delivery—Chinese" category. The listings in the "Restaurants—Delivery—Pizza" category may have a default coverage area of a 0.5 mile radius from the business location. The default value of the coverage area may be something entirely different for listings within another category. For example, the listings in the "Restaurant—Delivery—Chinese" may have a default coverage area of a 0.25 mile radius from the business location because most Chinese restaurants may not have the facilities to provide delivery service beyond that area. In this manner, the system is able to advantageously link a default value of the coverage area to a categorizing characteristic of the business represented by the listing. Additionally, the system is able to define the coverage area without regard to predefined boundaries, such as zip codes, cities, counties, states, or other politically defined boundaries. Thus, potential inaccuracies inherent to the use of predefined boundaries can be advantageously avoided when defining coverage areas without regard to such predefined boundaries.

Alternatively, the coverage area for a listing may be defined based upon certain selection criteria. Examples of such selection criteria include whether a fee has been paid by a business represented by the listing to define the coverage area in a selectable or customized way. For example, a large fee payment by a business would be made in exchange for a more favorable definition of the coverage area of the business' listing 235 in the index 37.

The more favorable definition is typically implemented as a customized coverage area for the paying business when compared to the default coverage area for other similarly categorized businesses. The customized area may be a larger area, when compared to the default coverage area, for a business having the capacity and desire to serve a larger geographic area. On the other hand, the customized area may be a smaller area, when compared to the default area, if the business desires to limit its coverage area. Limiting the business' coverage area may be advantageous when the business does not have the capacity nor the desire to service a larger geographic area, such as the default coverage area. Thus, it is important to realize that the customized coverage area may be an area of any size or shape (smaller or larger than the default coverage area) and may even include multiple distinct areas.

Once the coverage areas are defined for each listing 235, a reference point from which to search and a search region in which to search are determined. When determining the reference point for the search and the search region in which to search, the front end modules 33 are provided with information about the reference point and about the search region, typically in the form of user selections.

The provided information may be in the form of an address of the reference point, such as a street address. The information provided may also be a telephone number associated with the reference point. Typically, non-mobile telephones are associated with a given billing address. The information provided may also be information about a landmark or street intersection. The provided information may also be stored in advance within a preregistration table. In any event, a lookup table 230 is used to cross reference this information to location data or grid coordinates of the reference point. Typically, these coordinates are standard longitude and latitude coordinates. However, the location data may be any information regarding the location of the reference point.

Once the reference point and the search region are determined, the index 37 is processed by the search engine module 39 to search the search region and find the coverage areas intersecting the search area. The intersecting coverage areas within the search area are then ranked. The desired listing is identified as the listing in the index 37 associated with the highest ranking coverage area found within the search area. The identification of the desired listing is then distributed from the search engine module 39 to the user via the middleware 38 and one of the delivery modules 34.

Exemplary Search Area and Coverage Areas

In the context of the above discussion on the IR system modules 26, what follows is a more detailed description of how coverage areas (as defined for the listings 235 in the index 37) and a search region may intersect and how a desired listing is determined based upon their intersection. FIG. 3 is a conceptual diagram illustrating such an intersection of two coverage areas and a search region defined about a reference point in accordance with an embodiment of the present invention.

Referring now to FIG. 3, two business entities 300*a*, 300*b* are shown in proximity to a reference point 305 in a map-like fashion. In other words, it is helpful to consider the illustration in FIG. 3 to be a map 350 showing the locations of the business entities 300*a*, 300*b* relative to the reference point 305. The reference point 305 is a location from which a search for the closest business entity serving the reference point 305 is to be conducted. The business entities 300*a*, 300*b* are businesses represented by the categorized listings 235 within the index 37.

The business entities 300*a*, 300*b* and the reference point 305 are located relative to each other within a grid of coordinates (not shown) on the map 350. The grid of coordinates is not shown so as to avoid a cluttered and confusing illustration. Those skilled in the art will appreciate the fact that each of the business entities 300*a*, 300*b* and the reference point 305 has its own set of coordinates, such as standard longitude and latitude coordinates, relative to the map 350 identifying its respective location.

The business entities 300*a*, 300*b* also have coverage areas 310*a*, 310*b* respectively defined to represent a region in which the business entities 300*a*, 300*b* service customers. These coverage areas 310*a*, 310*b* are defined within the index 37 as associated with the listings 235 representing the business entities 300*a*, 300*b*. While these coverage areas 310*a*, 310*b* are illustrated as being circular-shaped about the location of each business entity 300*a*, 300*b*, the present invention contemplates a coverage area comprising one or more distinct regions, each of which having an arbitrary polygon shape. It is simply a matter of creating a definition of the relevant coverage areas 310*a*, 310*b* within the index where the definition describes the location of each region and the shape of each region.

Furthermore, the present invention contemplates a coverage area that may not encompass the location of the business entity. This is especially applicable to a business entity that provides a service instead of a product. For example, Dewey's Fine Fasteners is the name of a fictitious small business in the locksmith business. Dewey's Fine Fasteners locksmith business is headquartered in Roswell, Ga. where all the administrative and billing parts of the business are located. However, Dewey's Fine Fasteners actually provides services in only parts of downtown Atlanta, Ga. and in some part of Alpharetta, Ga. (an area just outside of Atlanta). Neither Alpharetta nor Atlanta includes Roswell, the actual location of the business. Thus, a coverage area for Dewey's Fine Fasteners could be defined for parts of downtown Atlanta and part of Alpharetta without regard to the predefined boundaries of Atlanta and Alpharetta.

Typically, a user desires to use the IR system modules 26 to find the closest of a particular type of business to the reference point 305. First, the user selects the type of business desired. For example, the user may select to search for the closest pizza delivery business. At this stage, the index 37 has listings 235 with the coverage area definitions for each pizza delivery business. In the context of the exemplary embodiment of the present invention, it is these listings 235 that are searched and from which a desired listing is determined.

Next, the reference point 305 is determined by using provided information about the reference point 305. The location of the reference point 305 is determined from the provided information (e.g., the telephone number of the user's conventional telephone 42, the address of the user, a street address provided by the user, another telephone number provided by the user, a landmark or intersection described by the user, etc.).

In one embodiment of the present invention, the conventional telephone 42 is further defined to be a fixed, wireless, cellular or other type of telephone capable of sending location data (such as global positioning system (GPS) location information) within the signal sent from the telephone 42. Such a telephone 42 capable of sending location data is known in the art and has been used in connection with Emergency 911 systems capable of quickly determining a caller's location based on the GPS location data sent with the signal from the caller's mobile telephone. The GPS location data is generated using an embedded GPS satellite receiver in connection with the telephone 42. Furthermore, in this embodiment of the present invention, the GPS location data (e.g., longitude/latitude coordinates) is preferably updated with each message sent from the telephone 42 to insure the most accurate and up-to-date location data with which to use.

In another embodiment, the location data is generated by the telephone network 46 itself using triangulation techniques or other techniques to identify the cell location or the actual physical location of the telephone 42, including both handsets and base units. While the above-described embodiments use GPS coordinates and telephone network cell locations as examples of the location data, it is important to understand that the location data may be generated using any method as long as the location data provides information on the location of the reference point and is provided within the signal sent from the telephone 42.

The location of the reference point 305 is then determined by interpreting the location data (e.g., the coordinates) within the telephone's transmitted signal.

Once the location of the reference point 305 is determined, the user defines a search region 330 in proximity to the reference point 305. For example, a user may select the reference point 305 to be the user's house and then select the search region 330 to be an area within 0.3 miles of the user's house.

At this point, the parameters for a search within the search region 330 have been established. The coverage areas 310a, 310b have been defined after which the reference point 305 and the search region 330 have been determined. The search is conducted to find which, if any, coverage areas have portions which are contained within the search region 330 and, thus, intersect the search region 330. In the example illustrated in FIG. 3, there are two intersecting areas 325a, 325b of the coverage areas 310a, 310b within the search region 330. It is the use of such intersecting areas 325a, 325b that helps to improve the accuracy of determining a desired listing (i.e., the closest entity to appropriately serve the reference point 305).

As previously mentioned, prior art systems for determining a desired business listing merely compute the distances 320a, 320b between the reference point 305 and the business entities 300a 300b. The problem with this prior approach is that no weight is given to the business' typical coverage area. In other words, depending solely upon the distance to a entity can lead to inaccuracies because a relatively close entity 300b may not serve the reference point 305 and a relatively distant entity 300a may easily serve the reference point 305.

The present invention advantageously gives weight to coverage areas without regard to predefined boundaries, such as politically defined boundaries. In one embodiment, the desired listing is determined based upon the amount of area within the intersecting areas 325a, 325b. The coverage area 310a preferably having the highest amount of intersecting area 325a when ranked against the other intersecting area 325b is deemed to be associated with the business entity 300a represented by the "desired" listing 235. In this way, the focus of determining the desired listing is shifted from a pure distance criteria (as is in the prior art) to one of the entity's actual ability to provide a service or product to a user or customer without regard to predefined boundaries (such as politically defined boundaries). Thus, the intersection of the search region 330 and the coverage areas 310a, 310b is used to more accurately determine the desired listing.

In another embodiment, a distance 315a, 315b to the edge of each coverage area 310a, 310b is determined. The coverage areas 310a, 310b intersecting the search region 330 can be ranked based upon these distances 315a, 315b. Thus, the desired listing is identified based on the relative proximity of each intersecting coverage area 325a, 325b to the reference point 305.

Use of these distances 315a, 315b is particularly helpful for determining a desired listing when there is no coverage area overlapping the reference point 305. In such a situation, the distances 315a, 315b may more accurately reflect how far away the reference point is from the nearest place that one of the business entities can serve. For example, a first business entity 300a is a distance 320a of one mile away from the reference point 305. A second business entity 300b is a distance 320b of 0.6 miles away from the reference point 305. Despite the fact that the second business entity 300b is closer to the reference point 305, it is the first business entity 300a that is the desired business to service the reference point 305 because the first business entity's coverage area 310a is closer to the reference point 305 than the second business entity's coverage area 310b. Thus, it is desirable to identify a listing 235 representing the first business entity 300a as being "desired" because the listing represents the closest entity to serve the reference point 305.

In summary, each business entity has a coverage area which is used in an embodiment of the present invention. A search region 330 is searched for intersecting areas 325a, 325b related to coverage areas 310a, 310b of particular business entities 300a, 300b relative to the reference point 305. By using these intersecting areas 325a, 325b to determine which coverage area is the better choice for serving a reference point 305, a more accurate determination of the desired entity (represented by a desired listing) can be made.

Flow Diagrams on Use of the Memory Map Module

In the context of the above described conceptual diagram and the software modules of the IR system modules 26, exemplary steps for determining a desired listing using an intersection of a search region and coverage areas are described below with regard to FIGS. 4 and 5. FIG. 4 is a general flow diagram illustrating steps of an exemplary method for determining a desired listing of a business using an intersection of a search region and coverage areas for business listings in accordance with an embodiment of the present invention.

Turning now to FIG. 4, the method 400 begins at step 405 where a coverage area for each listing is defined. As previously mentioned, a coverage area is preferably defined without regard to predefined boundaries. This may be accomplished by creating a default definition for a particular listing's coverage area depending upon how the listing is categorized within the index 37. Furthermore, the coverage area may be modified or defined as being a selectable area based upon selection criteria, such as payment of a fee from the business represented by the listing. This allows the business to select a customized coverage area different than the default definition for the business' category of business.

At step 410, a reference point is determined within a search region. In the exemplary embodiment, the user selects the reference point 305 by providing information about the reference point 305.

At step 415, a search is conducted from the reference point to find any intersecting coverage areas from the coverage areas intersecting the search region. In the exemplary embodiment, the search is a radial search from the reference point 305 to the extreme boundaries of the search region 330 because the reference point 305 is included and centered within the search region 330. However, any method of searching the search region 300 will suffice for an embodiment of the present invention. The intersecting coverage areas are essentially coverage areas overlapping or found within the search region. Each intersecting coverage area has a distinct amount of area intersecting the search region.

At step 420, one of the listings is identified as a "desired listing" based upon its association with one (e.g., the largest) of the intersecting coverage areas found within the search region. In one embodiment, the desired listing represents the business entity having the greatest amount of intersecting coverage area with the search region. In another embodiment, the desired listing represents the business entity with its intersecting coverage area in the search region being closest to the reference point. The method 400 ends after step 420. In summary, searching for a particular kind of entity (represented as a desired listing) in relation to a reference point can be more accurately accomplished using the intersection of coverage areas for those entities and a search region.

FIG. 5 is a more detailed flow diagram illustrating steps of an exemplary method for determining a desired listing using an intersection of a search region and coverage areas for listings in accordance with an embodiment of the present invention. Turning now to FIG. 5, the method 500 begins at step 505 where a coverage area is defined to be associated with each listing representing different entities. As previously mentioned, a coverage area is preferably defined without regard to predefined boundaries.

Defining a coverage area for each entity may be accomplished by creating a default definition for a particular listing's coverage area depending upon how the listing is categorized within the index 37. In another embodiment, the coverage area may be modified or defined based upon any type of selection criteria, such as payment of a fee from the business represented by the listing. For example, a grocery store may want to project a larger service area than the default definition of a coverage area for the grocery store category of business. A restaurant may use a customized definition of its coverage area as a marketing tool to target a larger potential customer base or to target one or more specific geographic regions. Those skilled in the art will recognize the potential for diminishing returns for defining one's coverage area too large. Doing so may help to expose one's business to more potential customers but may only frustrate potential customers if the business cannot adequately provide service to the potential customers.

It is important to realize that while the coverage areas 310a, 310b illustrated in FIG. 3 are circularly centered about their associated business entity 300a, 300b, other more arbitrarily-shaped coverage areas are possible. Additionally, the present invention contemplates defining coverage areas having multiple, distinct areas of varying shapes.

At step 510, a reference point is determined based upon provided information about the reference point. The provided information can come in a variety of forms depending upon if the user provides the information from the remote computer 41 or from a telecommunication device, such as the conventional telephone 42. If the user provides the information from the remote computer 41, the user typically types in text or makes selections which are then translated into a form of digital information about the reference point. For example, the user may type in a street address of the reference point, a telephone number that is associated with the location of the reference point, a landmark representing the reference point, or a description of an intersection (such as the names of two intersecting streets).

If the information is provided using the conventional telephone 42, the user is not easily able to type or key in a street address, landmark description, or description of an intersection. In such a situation, the present invention contemplates that an audio description of the information, e.g., a street address, landmark, or intersection, could be transformed into a computer-readable form of the information using speech recognition techniques.

Additionally, the information about the reference point may be provided by using the keypad entry (not shown) of the conventional telephone 42 to key in a telephone phone number associated with the reference point. If the user selects the reference point to be the location of another telephone (not shown) other than the location of the telephone 42 being used, the user simply keys in a telephone number of the other phone (not shown). In this manner, the provided information about the reference is the telephone number of the other telephone (not shown), such as the telephone number of a user's home telephone number when the user is calling from the user's business telephone.

The present invention also contemplates providing the information about the reference point in a more automatic fashion without requiring a response from the user. For example, Automatic Number Identification (ANI) is a feature of the conventional Signaling System 7 (SS7) telecommunications protocol. Basically, ANI provides a series of digits within an SS7 message from a calling party. The digits indicate the telephone number of the calling party. Thus, the ANI information within a message from the user via the conventional telephone 42 provides the information about the reference point as the telephone number at the reference point location.

Another example of automatically providing information about the reference point is through the use of a conventional caller identification feature (Caller ID). Caller ID capability identifies the telephone number of a calling party and provides the telephone number or other data as information about the reference point.

As previously mentioned, if the conventional telephone 42 is a mobile telephone rather than being associated with a fixed location, the information about the reference point may be provided as part of a signal sent from the mobile telephone. In order to provide the signal, the mobile telephone must be equipped to receive GPS satellite positioning signals from one or more geosynchronously orbiting satellites. The positioning signals are interpreted by the mobile telephone to determine the mobile telephone's longitude/latitude, altitude, and velocity. The GPS location data, namely the longitude/latitude coordinates, can then be transmitted from the mobile telephone as part of a communications signal transmitted from the mobile telephone. The GPS location data is preferably updated and included with each message sent from the mobile telephone in order to insure the most accurate and up-to-date location data.

At step 515, a location of the reference point is determined. In an embodiment of the present invention where the information about the reference point is provided as computer-readable information (e.g., an address, telephone number, landmark, or intersection of streets), the information is cross-referenced in the lookup table 230 to determine the location of the reference point. If the information is an audio description of such information and has been transformed into a computer-readable format via speech recognition techniques, the information is similarly cross-referenced in the lookup table 230 to determine the location. If the information is the GPS location data within a communications signal from a mobile telephone, the location is determined by simply interpreting the GPS location data within the signal.

At step 520, a search region is selected based upon a proximity to the reference point. Typically, the search region is selected as an area within a radius distance from the reference point. However, the search region may be any shape while remaining defined relative to the reference point. Furthermore, the search region may be selected to not include the reference point while remaining defined relative to the reference point.

At step 525, a search is conducted from the reference point to find any intersecting coverage areas from the coverage areas intersecting the search region. In the exemplary embodiment, the search is conducted as a radial type of search from the reference point. Other methodologies of searching within the search region for any intersecting coverage areas will suffice for the present invention.

At step 530, the coverage areas found to be intersecting the search region are ranked into a ranked order. In one embodiment, the ranking and, thus, the ranked order of coverage areas is based upon the amount of intersecting area for each intersecting coverage area found within the search region. Typically, the coverage area having the greatest amount of intersecting area is ranked highest within the ranked order. Alternatively, the ranking and, thus, the ranked order of coverage areas is based upon the proximity to the reference point for each coverage area found intersecting the search region. In this alternative embodiment, the coverage area being closest to the reference point is ranked highest within the ranked order.

Based upon the ranked order of the coverage areas, one of the listings is identified as the desired listing at step 535. In general, a listing associated with a predetermined one of the ranked intersecting coverage areas is identified as the desired listing. In the preferred embodiment, the predetermined one of the ranked intersecting coverage areas is the intersecting coverage area having the highest ranking in the ranked order. Thus, in the preferred embodiment, the listing associated with the highest ranked coverage area within the ranked order is identified to be the desired listing. At step 540, an identification of the desired listing is then distributed, typically from the search engine module 39 to the middleware routing architecture 38, to one of the delivery modules 34, and then back to the user. After step 540, the method 500 ends. Thus, the user is able to use the IR system modules 26 and the index 37 to determine a desired listing representing the closest entity serving the reference point.

Conclusion

From the foregoing description, it will be appreciated that an embodiment of the present invention provides a system and method for determining a desired listing using an intersection of a search region 330 and two or more coverage areas 310a, 310b. The coverage areas for each business entity 300a, 300b may be defined by default depending upon a categorization of the business entity and without regard to predefined boundaries. Alternatively, a coverage area may be defined as a customized area depending upon selection criteria, such as payment of a fee. A reference point 305 may be determined based upon information provided about the reference point 305, such as a phone number, address, landmark, or intersection description. The location of the reference point 305 is also determined from the provided information, typically by cross-referencing the information to location data within a lookup table 230. A search region 330 is then selected based upon a proximity to the reference point 305.

Once the definitions of the coverage areas 310a, 310b are created and the reference point 305 and the search region 330 are determined, a search is conducted of the search region 330 to find coverage areas 310a, 310b having intersecting areas 325a, 325b within the search region 330. Those intersecting coverage areas found within the search region 330 are ranked into a ranked order. The ranked order may be based upon the amount of intersecting area 325a, 325b for each coverage area 310a, 310b or may be based upon the proximity of the intersecting areas 325a, 325b for each coverage area 310a, 310b to the reference point 305. Based upon the ranked order, one of the listings 235 is identified as the desired listing representing the closest entity 300a serving the reference point 305. Finally, an identification of the desired listing 235 is then distributed back to the user.

The foregoing system and method may be conveniently implemented in one or more program modules having code that is based upon the flow diagrams in FIGS. 4 and 5. Moreover, the present invention has been described in relation to particular embodiments which are intended in all respects to be illustrative rather than restrictive. However, those skilled in the art will understand that the principles of the present invention apply to any tasks or processes that must search for an entity represented by a desired listing to meet a user's search criteria.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for determining a desired listing from a plurality of listings using an intersection of a search region and a plurality of coverage areas associated respectively with each of the listings, comprising:

(1) creating a definition with respect to each of the coverage areas, the definition being created without regard to a predefined boundary;

(2) finding each of the coverage areas intersecting the search region as intersecting coverage areas;

(3) identifying one of the listings as the desired listing based upon the desired listing being associated with a predetermined list of intersecting coverage areas;

(4) determining a reference point within the search region based upon provided information about the reference point; and (5) determining a location of the reference point based upon the provided information.

2. The method of claim 1, wherein the step of determining the reference point further comprises determining the reference point based upon the provided information comprising a telephone number of a telecommunications device; and wherein the step of determining the location further comprises determining the location of the reference point based upon the provided information comprising location data providing the location of the reference point, the location data being associated with the telephone number within a lookup table.

3. The method of claim 2, wherein the step of determining the reference point further comprises determining the reference point based upon the provided information being received over a first telecommunications device as the telephone number of a second telecommunications device.

4. The method of claim 1, wherein the step of determining the reference point further comprises determining the reference point based upon the provided information comprising location data within a signal generated by a telecommunications device; and wherein the step of determining the location further comprises determining the location of the reference point by interpreting the location data.

5. A method for determining a desired listing from a plurality of listings using an intersection of a search region and a plurality of coverage areas associated respectively with each of the listings, comprising:

(1) creating a definition with respect to each of the coverage areas, the definition being created without regard to a predefined boundary;

(2) finding each of the coverage areas interesecting the search region as intersecting coverage areas;

(3) ranking the intersecting coverage areas into a ranked order based upon an amount of area intersecting the search region with respect to each of the intersecting coverage areas;

(4) identifying one of the listings as the desired listing based upon the desired listing being associated with a predetermined one of intersecting coverage areas in the ranked order; and (5) determining a reference point within the search region.

6. The method of claim 5, wherein a highest in the ranked order corresponds to one of the intersecting coverage areas having the greatest of the amount of area intersecting the search region.

7. The method of claim 5, wherein the ranking step further comprises ranking the intersecting coverage areas into the ranked order based upon a proximity of each of the intersecting coverage areas to the reference point.

8. A method for determining a desired listing from a plurality of listings using an intersection of a search region and a plurality of coverage areas associated respectively with each of the listings, comprising the steps of:

(1) creating a definition with respect to each of the coverage areas, the definition being created without regard to a predefined boundary, and the each of the coverage areas being a predetermined area based upon a categorization of each of the listings;

(2) determining a reference point based upon provided information about the reference point;

(3) determining a location of the reference point based upon the provided information;

(4) selecting the search region based upon a proximity of the search region to the reference point;

(5) finding each of the coverage areas intersecting the search region as intersecting coverage areas;

(6) ranking the intersecting coverage areas into a ranked order; and (7) identifying one of the listings as the desired listing based upon the listing associated with a highest one of the intersecting coverage areas in the ranked order.

9. The method of claim 8, wherein step (1) further comprises creating the definition with respect to each of the coverage areas to be a selectable area for each of the listings based upon selection criteria for the selectable area.

10. The method of claim 8, wherein step (2) further comprises determining the reference point based upon the provided information comprising a telephone number of a telecommunications device; and wherein step (3) further comprises determining the location of the reference point based upon the provided information comprising location data providing the location of the reference point, the location data being associated with the telephone number within a lookup table.

11. The method of claim 10, wherein step (2) further comprises determining the reference point based upon the provided information being received over a first telecommunications device as the telephone number of a second telecommunications device.

12. The method of claim 8, wherein step (2) further comprises determining the reference point based upon the provided information comprising location data within a signal generated by a telecommunications device; and wherein step (3) further comprises determining the location of the reference point by interpreting the location data.

13. The method of claim 8, wherein the ranking step further comprises ranking the intersecting coverage areas into the ranked order based upon an amount of area intersecting the search region with respect to each of the intersecting coverage areas, wherein the highest in the ranked order corresponds to one of the intersecting coverage areas having the greatest of the amount of area intersecting the search region.

14. The method of claim 8, wherein the ranking step further comprises ranking the intersecting coverage areas into the ranked order based upon a proximity of each of the intersecting coverage areas to the reference point.

15. A system for determining a desired listing from a plurality of listings using an intersection of a search region and a plurality of coverage areas associated respectively with each of the plurality of listings, the system comprising:

a processor;

a memory storage device coupled to the processor, the memory storage device maintaining an index of the listings, each of listings within the index being categorized based on an association of each of the listings with at least one of a plurality of index categories, each of the listings being associated with at least one of the coverage areas, and the memory storage device also maintaining a lookup table;

a communications interface coupled to the processor, the communications interface for communicating with a remote device; and the processor being operative to:

create a definition within the index with respect to each of the coverage areas, the definition being created without regards to a predefined boundary and based upon one of the index categories associated with each of the listings, receive provided information about a reference point from the remote device over the communications interface, determine a location of the reference point by using the provided information to find location data associated with the reference point, the location data maintained within the lookup table on the memory storage device, find intersecting coverage areas as each of the coverage areas intersecting the search region;

rank the intersecting coverage areas into a ranked order, identify one of the listings maintained within the memory storage device as the desired listing based upon the listing associated with a predetermined one of the intersecting coverage areas in the ranked order, and distribute an identification of the desired listing over the communications interface to the remote device.

16. The system of claim 15, wherein the processor is further operative to create the definition, with respect to each of the coverage areas, to be a selectable area for each of the listings based upon selection criteria for the selectable area.

17. The system of claim 15, wherein the processor is further operative to determine the location of the reference point based upon receiving the provided information from the remote device as a telephone number of the remote device; and wherein the processor is further operative to determine the location of the reference point based upon the provided information being location data maintained within the lookup table in the memory storage device, the location data providing the location of the reference point, and the location data being associated with the telephone number within the lookup table.

18. The system of claim 15, wherein the processor is further operative to determine the reference point based upon the provided information being location data within a signal generated by the remote device; and wherein the processor is further operative to determine the location of the reference point by interpreting the location data.

19. The system of claim 15, wherein the processor is further operative to rank the intersecting coverage areas into the ranked order, wherein a highest in the ranked order corresponds to one of the intersecting coverage areas having the greatest of the amount of area intersecting the search region.

20. The system of claim 15, wherein the processor is further operative to rank the intersecting coverage areas into the ranked order based upon a proximity of each of the intersecting coverage areas to the reference point.

* * * * *